Nov. 13, 1962  M. E. ASH  3,063,841
METHOD OF DISPENSING LIQUIDS
Filed June 27, 1960
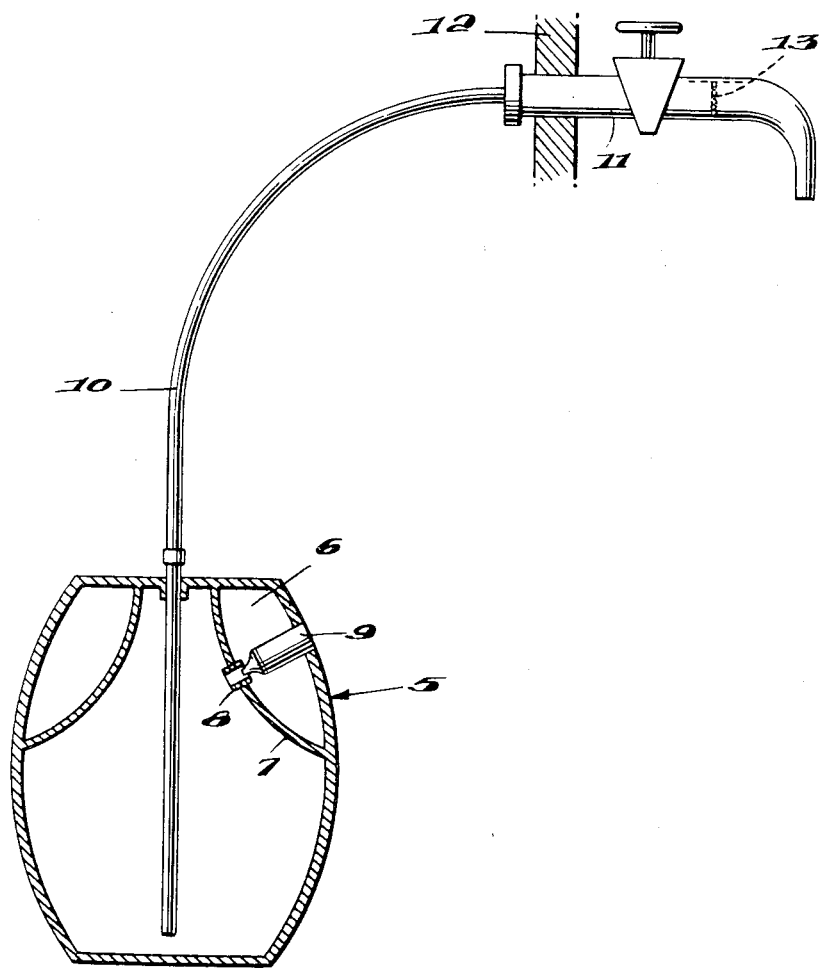
Inventor
Michael Edward Ash,
By Pierce, Scheffler & Parker
his Attorneys

United States Patent Office 3,063,841
Patented Nov. 13, 1962

3,063,841
METHOD OF DISPENSING LIQUIDS
Michael Edward Ash, Ealing, England, assignor to Arthur Guinness Son and Company (Park Royal) Limited, a British company
Filed June 27, 1960, Ser. No. 38,699
Claims priority, application Great Britain Jan. 23, 1958
9 Claims. (Cl. 99—49)

This invention relates to improvements in a method of dispensing beverages containing gas in solution, more particularly fermented liquors such as beer, stout and ales.

This application is a continuation-in-part of co-pending application Serial No. 788,612, filed January 23, 1959.

In the past, draught beer was normally served from the wood, either through a beer engine or, where the cask was stillaged on or just below the bar, from an ordinary tap. Barnes and others then devised bushes and ancillary fittings which made it practicable to draw liquors from a pressurized vessel. Many brewers have used these fittings so as to modify their sysems of draughting beer. For example, I have used an 11-gallon cask into which I put 8 gallons of beer together with an applied air pressure of 40 p.s.i. (gauge) in the remaining 3 gallon space, this air pressure being sufficient to drive all the beer out of the cask without the necessity for spilling. However, as with earlier systems, the partial pressure of carbon dioxide in the beer varies during the draughting of a cask and this in turn means that the amount of foam or "head" as compared with beer in the glass, also varies. I have preferred to use the same beer for draught trade as for bottle trade and the amount of prime in the beer at racking has been determined by the degree of attenuation which it is thought fit to allow in bottle. It so happens that this prime, when present in 8 gallons of beer in an 11-gallon cask, gives rise after about a week of conditioning to a partial pressure of 20 p.s.i. of carbon dioxide, which when added to the 40 p.s.i. of air initially in the system, raises the total pressure to 60 p.s.i. (gauge).

The result of high pressure of this order is that when liquor is drawn from a full, conditioned cask it froths abundantly and the drawing of half-a-pint may take many minutes. To overcome this two casks have been used, one at low pressure and the other at high pressure. The glass was partly filled with relatively flat liquor from the low pressure cask and was then topped up with liquor from the high pressure cask. This had the disadvantage that in order to produce the low pressure the cask must be spilled, thus admitting air when leads to the acetification of the liquor by areobic bacteria.

To overcome the problem of acetification and so improve the keeping qualities of bitter beers many brewers have recently introduced the use of pressurized casks which contain a pressure of carbon dioxide alone, in direct contact with the beer, the air being virtually excluded. The pressure is kept constant in the cask by the introduction of carbon dioxide from an external cylinder through a reducing valve. This method of dispensing is successfull in the case of liquors which are acceptable without a finely divided and enduring head.

Among the qualities normally sought in a head on beverages such as beer, ale and stout, may be listed the following:

Regularity, by which is meant a consistent bubble size.

Fineness, by which is meant a small bubble size, e.g., bubbles up to about 0.010 inch average diameter.

Homogeneity, by which is meant a continuity of bubble structure without the occurrence of large irregularly shaped random gaps.

Endurance, by which is meant the ability of the bubble structure, when it has risen to the surface of the liquor after dispensing into a drinking vessel, to persist during the process of drinking and regardless of whether or not the liquor is quaffed rapidly or sipped slowly.

By the expression "size of head" is meant the volume of froth initially present on the top of the liquor in any given drinking vessel, after the beverage has been dispensed and the majority of the bubbles in suspension have had time to settle out from the liquor.

The object of the present invention is to provide a method suitable for the dispensing of beverages containing gas in solution, such as beer, from a system having a single pressurized vessel. A further object is to provide a method for the rapid direct dispensing of such beverages which produces a regular and enduring head of controlled size, superior to heads hitherto obtained from such a system.

I have discovered that when a beverage, particularly beer, containing gas in solution is dispensed under pressure, the presence of a mixture of carbon dioxide and an inert gas (substantially free from oxygen) dissolved in the liquor, appears to provide a head which has greater regularity and is considerably more enduring than when the gas in solution is carbon dioxide alone.

According to the present invention, there is provided a method for the rapid dispensing, from a pressurized system, of beverages which contain gas in solution, including the steps of providing in solution in the liquor a mixture of carbon dioxide and an inert gas as herein defined) and maintaining the pressure of mixed gases in solution throughout the dispensing operation, by an applied counter-pressure which also acts to expel the liquor from the system through a delivery passage and tap to an outlet.

By the term "inert gas" I mean a gas which has the following properties:

(a) It does not itself react chemically with the liquor particularly with beer.

(b) When applied to, or dissolved in, the liquor it does not promote or allow, in the liquor after gasification, chemical reactions such as acetification, which in the absence of the inert gas would tend to take place.

(c) As compared with carbon dioxide:
   (i) it is poorly soluble in beer, e.g., in the order of less than 5% by volume as compared with 100%.
   (ii) it does not have a large effect on the size of head for a given pressure change of the dissolved gases.

(d) It is not harmful to the consumer.

(e) It does not impair the normal taste of the liquor.

The inert gas which clearly satisfies all the above requirements and which I prefer to use, is nitrogen, since this gas is not only "inert" as above defined, but is also inexpensive and non-flammable. In this latter respect, I believe that hydrogen or methane may be examples of inert gases which would satisfy the definition given above but, being flammable, they would not normally be desirable to use as propellents for draught beer or similar liquor.

When dispensing, in particular, fermented liquors such as beer, stout and ales, from a pressurized vessel such as a Barnes cask, I prefer to use a mixture of carbon dioxide and nitrogen as the propellent.

While the particular pressurized vessel used in the process forms no part of the present invention it may be noted that the pressurized vessel may be a metal cask equipped with a cylinder to contain the mixed gases under pressure, a reducing valve and bush and a tap through which the liquid contents of the cask may be drawn off. Preferably the gas cylinder and reducing valve are housed within the cask. Alternatively a plurality of pressurized vessels may be supplied with the mixed gases from a single cylinder or battery of cylinders.

The proportion of carbon dioxide in the gas mixture may be varied within a wide range according to the type of head desired in the draught liquor. My experience indicates that the size of head varies principally with the partial pressure of the carbon dioxide in solution, whilst the appearance and endurance of the head are controlled mainly by the partial pressure of the nitrogen in solution. When the size of head required has been decided, then corresponding to any chosen partial pressure of nitrogen in the range 0–50 p.s.i. there exists a partial pressure of carbon dioxide which will give exactly that amount of head (at a fixed temperature). I have found that an increase in the partial pressure of nitrogen from 0 to 10 p.s.i. results in a very marked improvement in the character and endurance of the head. A further smaller improvement takes place between 10 and 20 p.s.i. Beyond this I have observed no important further improvement.

I have found that in normal conditions satisfactory results are obtained if the partial pressure of the carbon dioxide in the mixed gases lies within the range 12 to 20 p.s.i. and that of the nitrogen within the range 5 to 40 p.s.i.

In the case of beer and particularly stout, I prefer a gas mixture giving a carbon dioxide partial pressure of about 15 p.s.i. and a nitrogen partial pressure of about 20 p.s.i. (i.e. a resultant gauge pressure of 20 p.s.i.). At 60° F. this mixture gives an attractive and enduring head, occupying about 10% of the volume of the glass.

In order that beer or stout shall be suitable for draughting in this manner nitrogen and carbon dioxide must be dissolved in it to the extent of the required partial pressures (when in equilibrium), or approximately so. This may be done in racking tank after which the beer would be racked into cask under counter-pressure; alternatively the pressures may be adjusted in cask. Fermentation must not be allowed to take place in cask after the correct pressures have been obtained, since this would add to the pressure of carbon dioxide. The cessation of fermentation can be achieved by fermenting out all prime in tank, before racking, by pasteurization, filtration, or in a number of ways well known to brewers.

The gas mixture may be supplied from a cylinder containing the two gases in the appropriate proportions; or the two gases may be supplied from separate cylinders and allowed to mix in the pressurized vessel, though this involves complications.

In cases where the cask is not expected to remain on ullage for a prolonged period, and where also the cask is unlikely to be agitated whilst actually on ullage (agitation during transit does not matter) and provided that the beer is properly prepared by first dissolving in it mixed gases to the extent of the required partial pressures (when in equilibrium) on the lines described above, it is sufficient to use nitrogen only as the propellent gas. The pressure of nitrogen chosen should be approximately the sum of the partial pressures of nitrogen and carbon dioxide in solution in the liquor. Pressurization with nitrogen alone will be satisfactory in cases when the cask is to be exhausted within a fortnight or less from the commencement of draughting. It will be understood that other factors come into consideration; for example, temperature has a slight influence, as also has the pattern on which the cast is draughted; for instance, if the cask were 90% emptied at the commencement, this would be less favorable than if it were draughted uniformly throughout the period.

The suitability of nitrogen for use as the sole propellent gas results from the very slow rate (in the absence of agitation) at which carbon dioxide comes out of solution in the liquid so as to regain equilibrium; always provided that the total pressure of gas above the liquor, exceeds the partial pressure of carbon dioxide in solution, thus preventing the formation of bubbles of carbon dioxide beneath the surface of the liquor. Naturally, when using nitrogen as the sole propellent gas, there will be a very slight continuous reduction in the size of head as the cask is draughted, even during the first fortnight.

Mixtures containing carbon dioxide and nitrogen in various proportions not in equilibrium with the gases in solution in the liquor may be used in various circumstances if desired. I prefer, however, that the partial pressure of carbon dioxide in the propellent gas should not exceed the partial pressure in the liquor, since in that case the rate of achievement of equilibrium is much greater.

It is to be noted that, in my experience, physical pressure directly applied to the liquor, as distinct from the partial pressure of the two gases, does not seem to have a significant effect on the size or quality of head. Under the particular condition of equilibrium I have cited, of course, the total pressure exerted in the liquor would be the sum of the partial pressures of the two gases.

The release of bubbles and the control of the quality of the head may be effected by utilizing, in the delivery passage from the container, a primary constriction of calculated size and thickness as set forth in my copending patent application No. 38,889.

In the accompanying drawing the single figure is a diagrammatic representation of the apparatus aspect of the invention.

In the drawing, a generally conventional Barnes cask is shown generally at 5. Within the upper part of cask 5 is an annular gas chamber 6 having an interior wall 7. A bush 8 is mounted in an opening in wall 7, with which bush there cooperates a reducing valve, shown generally at 9, adapted to deliver gas under a predetermined pressure from chamber 6 into the upper part of cask 5. 10 is a discharge conduit, which may be in the form of a plastic tube, extending from the lower part of the cask upwardly through the latter and to a tap 11, having a conventional plug cock, which tap is mounted in a tap mounting 12. In that part of the tap 11 which is on the discharge side of the plug cock there is mounted a perforated disc 13 having a thickness of about 0.015 inch, the perforations of which have a diameter of about 0.02 inch.

The mechanism by which the gas mixture produces the desired result is not as yet clearly understood. It may be that, when the liquor emerges from the tap, the nitrogen dissolved in the liquor under pressure is released in finer bubbles than is the carbon dioxide owing to the much greater solubility of the latter. These fine bubbles may remain disseminated for an appreciable time and may thus add to the endurance of the head.

I claim:

1. A method of dispensing a beverage under pressure from a pressurized system into a drinking vessel so as to ensure a fine, regular and enduring head on the beverage in said vessel which comprises the steps of providing in solution in said beverage a mixture of carbon dioxide and an oxygen-free inert gas and applying a counter-pressure to said beverage which acts to maintain the pressure of the mixed gases in solution in said beverage throughout the dispensing operation without substantial variation of the partial pressure of either of said gases and also acts to expel the beverage from said system through a delivery passage and tap to the outlet thereof.

2. A method as defined in claim 1 which includes the step of storing said beverage in a pressurized container.

3. A method as defined in claim 1 in which the inert gas is nitrogen.

4. A method of dispensing a fermented beverage under pressure from a pressurized system into a drinking vessel so as to ensure a fine, regular and enduring head on the beverage in said vessel which comprises the steps of initially arresting fermentation in said beverage prior to dispensing and providing in solution in said beverage a mixture of carbon dioxide and an oxygen-free inert gas, subsequently maintaining the pressure of said mixed gases in solution throughout the dispensing operation without substantial variation of the partial pressure of either of said gases by the application of a counter-pressure not less than the sum of the partial pressures of said mixture of gases in solution, which counter-pressure also acts to expel said beverage from said system through a delivery passage and tap to an outlet.

5. A method as defined in claim 4 which includes the step of storing said fermented beverage in a pressurized container.

6. A method as defined in claim 5 in which said counter-pressure is applied by a mixture of gases exerting a total pressure which is initially greater than the sum of the partial pressures of said mixture of gases in solution, but which during storage in said pressurized container, is reduced to equilibrium with said gases in solution as a result of some part of said gases exerting said counter-pressure becoming dissolved into said beverage.

7. A method as defined in claim 4 in which said counter-pressure is applied by a mixture of gases at the same respective partial pressures as, and in total equilibrium with the gases in solution in said beverage, said counter-pressure acting directly on said beverage in direct contact therewith to expel said beverage from said system through a delivery passage and tap to an outlet.

8. A method as defined in claim 4 in which the mixture of gases consists essentially of carbon dioxide and nitrogen and the partial pressure of the carbon dioxide lies within the range from 12 to 20 p.s.i. and the partial pressure of the nitrogen lies within the range from 5 to 40 p.s.i.

9. A method as defined in claim 7 in which the mixture of gases consists essentially of carbon dioxide and nitrogen and the partial pressure of the carbon dioxide lies within the range from 14 to 16 p.s.i. and the partial pressure of the nitrogen lies within the range from 19 to 21 p.s.i.

References Cited in the file of this patent

UNITED STATES PATENTS

| | | |
|---|---|---|
| 241,677 | Lawton | May 17, 1881 |
| 591,686 | Peter | Oct. 12, 1897 |
| 633,341 | Dreckmann | Sept. 19, 1899 |
| 691,980 | Spietschka | Jan. 28, 1902 |
| 938,517 | Schmitt | Nov. 2, 1909 |
| 2,021,367 | Louis | Nov. 19, 1935 |
| 2,155,260 | Diller | Apr. 18, 1939 |
| 2,212,379 | Smith | Aug. 20, 1940 |
| 2,569,378 | Hood | Sept. 25, 1951 |
| 2,723,200 | Pyenson | Nov. 8, 1955 |
| 2,762,534 | Kish | Sept. 11, 1956 |